Figure 1:
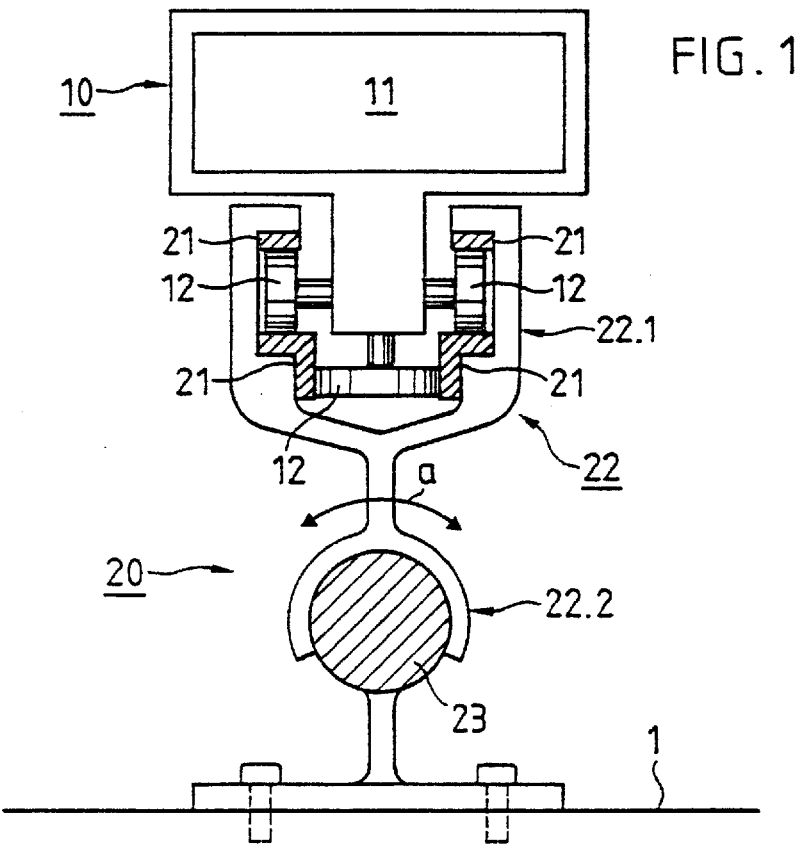

United States Patent [19]
Eberle et al.

[11] Patent Number: 6,113,273
[45] Date of Patent: Sep. 5, 2000

[54] MEANS FOR GUIDING THE ROLLING OR GLIDING MOVEMENT OF OBJECTS ALONG A GIVEN PATH

[75] Inventors: Juerg Eberle, Hinwil; Dieter Siebenmann, Russikon, both of Switzerland

[73] Assignee: IPT Weinfelden AG, Weinfelden, Switzerland

[21] Appl. No.: 09/308,921

[22] PCT Filed: Nov. 17, 1997

[86] PCT No.: PCT/CH97/00436

§ 371 Date: Jul. 22, 1999

§ 102(e) Date: Jul. 22, 1999

[87] PCT Pub. No.: WO98/23509

PCT Pub. Date: Jun. 4, 1998

[30] Foreign Application Priority Data

Nov. 27, 1996 [CH] Switzerland ............................. 2917/96

[51] Int. Cl.[7] ................................................... F16C 29/00
[52] U.S. Cl. ................................. 384/40; 384/42; 384/49; 384/501; 384/53
[58] Field of Search ................................. 384/40, 42, 49, 384/501, 53

[56] References Cited

U.S. PATENT DOCUMENTS

| 3,039,401 | 6/1962 | Bishop | 104/111 |
|---|---|---|---|
| 3,583,327 | 6/1971 | Arndt | 104/120 |
| 3,757,514 | 9/1973 | Reist | 59/78 |
| 4,170,943 | 10/1979 | Archrekar | 104/56 |
| 4,397,145 | 8/1983 | Reist | 59/78 |
| 4,703,697 | 11/1987 | Bell | 104/23.1 |
| 5,074,678 | 12/1991 | Eberle | 384/49 |

FOREIGN PATENT DOCUMENTS

| 1 014 925 | 8/1957 | Germany . |
| 1 535 428 | 12/1978 | United Kingdom . |

*Primary Examiner*—Lenard A. Footland
*Attorney, Agent, or Firm*—Pearne & Gordon LLP

[57] ABSTRACT

The guidance means (20) according to the invention is used for guiding the rolling or sliding movement of objects (10) along a predetermined or preset path or route, whose course is freely selectable within wide limits in space. The guidance means (20) has a guiding means extending without interruption over the predetermined path in the form of a cage-like arrangement of a plurality of at least limitedly bendable guide rails (21) and a plurality of support or carrying elements (22), which are arranged in mutually spaced manner along the predetermined path and which hold the guide rails (21) in parallel and in an at least partly spaced manner in the predetermined, cage-like arrangement. The guide rails (21) advantageously comprise a limited flexible, continuously manufacturable metal or plastic profile. The support elements (22) can be installed on a fixedly laid base element (23), e.g. in a position adjustable with respect to the base element (23). The profile material for the guide rails (21) and the discreet support elements (22) together represents a building block, with the aid of which guidance means with the most varied courses can be implemented.

13 Claims, 4 Drawing Sheets

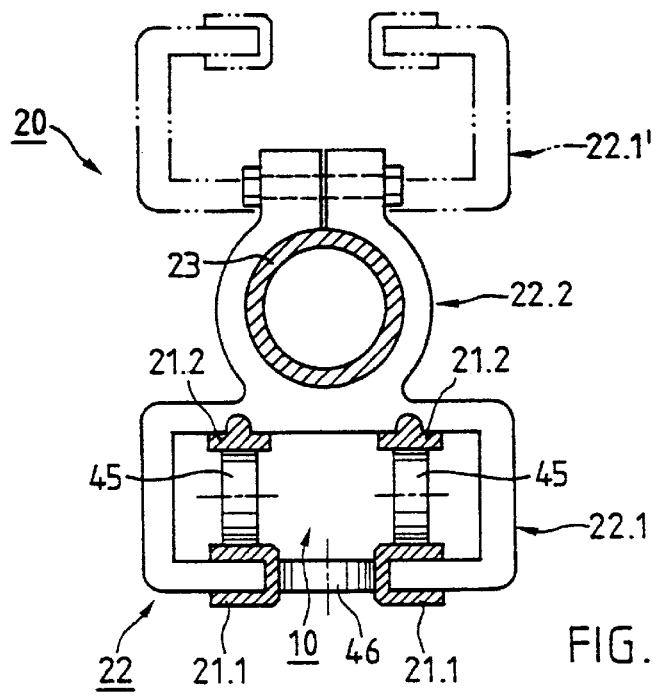
FIG. 7
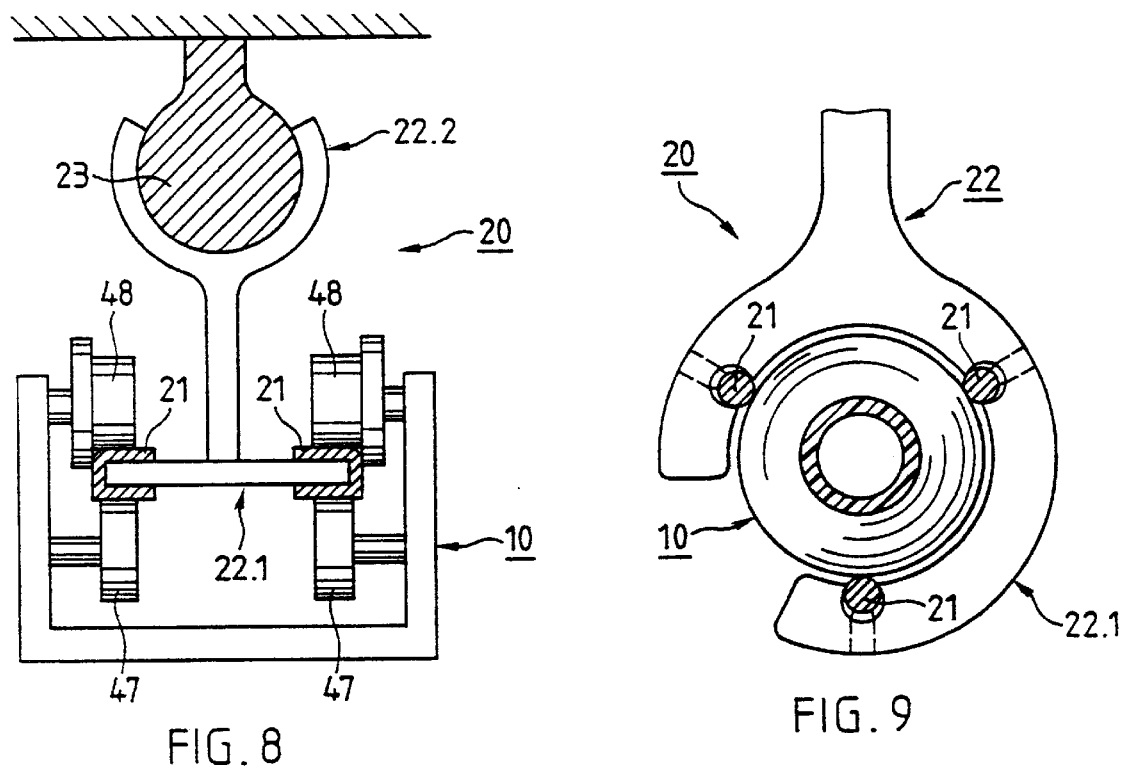
FIG. 8
FIG. 9

MEANS FOR GUIDING THE ROLLING OR GLIDING MOVEMENT OF OBJECTS ALONG A GIVEN PATH

The invention relates to a guidance means according to the preamble of the independent claim. The means is used for guiding the rolling or sliding movement of objects along a predetermined path or route, the spatial course of the predetermined path being freely selectable within wide limits. The objects movable along the predetermined path are e.g. individual, correspondingly driven conveying elements, which can be loaded with a load, or such conveying elements linked to form a chain, or force transmission means in the form of a chain or a row of individual elements.

According to the prior art such a guidance means conventionally comprises either a guide channel, in which the objects to be moved are wholly or at least partly trapped and on whose inner surfaces they roll or slide, the guidance means is rail-like and is embraced by the objects to be moved, which roll or slide on outer surfaces of the guidance means.

Conventionally for the implementation of such a guidance means the course of the path is firstly planned, then the guidance means is manufactured in accordance with the course of the path in the form of discreet parts and then said parts are installed in fixed form. Particularly at those points where the discreet parts are joined together a high precision is necessary or for a quiet and undisturbed running of the objects at said junction points special measures must be taken for linking the guidance means parts. The number of junction points can also be kept small, in that very long, but also cumbersome and path course-adapted guidance means parts are manufactured.

Such guidance means are not only complicated with respect to their manufacture and installation, but also for the same reasons with respect to subsequent modifications and/or extensions, particularly as a large part of the material not only has to be installed in fixed form, but must also be adapted in fixed form to a specific path course and is consequently unusable for a modified path course.

The problem of the invention is therefore to create a guidance means for guiding the rolling or sliding movement of objects along a predetermined or preset path, said guidance means, like the known guidance means, being installable in fixed form, but additionally can be more easily manufactured and installed and more easily modified and extended at lower cost than the known guidance means.

This problem is solved by the guidance means, as defined in the claims.

This problem is solved in that the functions of the system to be implemented are not only subdivided into a stationary and a moving function (guidance means and moving object), as forms the basis for the distribution of functions in the known systems. Additionally the stationary function (guidance means) is subdivided into a guiding and supporting or carrying function, the guiding means extending with a minimum number of interruptions in continuous manner over the entire, predetermined path and in which the support means, without any disadvantages for the system, is subdivided into a plurality of discreet, easily handlable and replaceable support elements.

The guiding means comprises a plurality of guide rails, which comprise a profile bendable at least to a limited extent and advantageous elastically bendable or flexible, which is advantageously continuously manufacturable and advantageously transportable and handlable in considerable lengths. Such a profile can not only be adapted without difficulty to the most varied path courses, but can also be reused for a modified course.

The supporting or carrying means comprises a plurality of support or carrying elements, which are arranged in spaced manner along the predetermined path and with the aid of which the guide rails are maintained in a predetermined, mutual arrangement and parallel to one another and to the predetermined path, said mounting support being advantageously reversible, i.e. randomly detachable and refixable. The extension of the support elements in the direction of the predetermined path is advantageously so small, that they are usable independently of the local course of the predetermined path, their spacings e.g. being adaptable to the local loading of the guidance means.

The predetermined, mutual arrangement of the guide rails is adapted to the objects to be guided by the guidance means, i.e. the guide rails form a substantially cage-like arrangement extending uniformly over the predetermined path and either the guide surfaces of the guide rails on which the objects roll or slide, are directed against the interior of the cage and the parts of the support elements holding the guide rails are located on the outside, or the guide surfaces are on the outsides of the cage and the corresponding parts of the support elements are located in the interior.

The supporting means can be further subdivided, in that the plurality of support elements holding the guide rails or at least part thereof, instead of being irreversibly installed on a base, are instead reversibly installed on at least one base element. This base element extends along at least part of the predetermined path. If the support elements and the base element are constructed in such a way that the installation positions of the support elements relative to the base element are adjustable, the at least one base element, without high precision, can be installed or laid along a path and the precision necessary for the guiding means can be provided on installing the support elements on the base element.

A system in which the guidance means according to the invention is used, apart from highly portable objects (e.g. conveying means in the form of rollers, trucks or chains) has guidance means parts, which are also at least partly portable, i.e. easily interchangeable (guide rails and optionally support elements) and guidance means parts, which are not portable, i.e. only interchangeable with a much greater effort and expenditure (base elements and optionally support elements), said subdivision not being intended as a functional subdivision, but as a formal, material subdivision. Thus, according to the invention, a roller guide e.g. comprises a fixedly installed, non-portable, stationary base element, separately mountable or replaceable, portable support elements and guide rails and associated, highly portable, mobile conveying means. All these parts are functionally interconnected and form a conveying system, which can be randomly modified and disassembled.

In the sense of the invention e.g. the base element is fixedly installed. To it are then fixed in replaceable and optionally adjustable manner the support elements, then the guide rails are laid between the individual support elements and advantageously fixed to each support element. The final stage involves the insertion of the objects to be moved along the predetermined path.

The mobile objects are highly portable, i.e. replaceable at any time and optionally during operation, whereas the portable parts of the guidance means although being interchangeable or replaceable, this only applies when operation has been stopped. The non-portable base elements are firmly connected to structures and cannot be interchanged or modified in the portability sense.

Apart from the already described flexibility, this also provides the following advantage. Fixedly walled in guides can only be replaced with difficulty in the case of wear and even minor changes lead to high costs for labour and equipment. In all cases a complete entity and not a separated structure is involved, in which relatively expensively performed guidance functions can be handled separately from relatively inexpensively performed support functions. The less expensive, supporting means are installed in fixed or at least partly fixed form for the supporting function, whereas at least the more expensive, guiding means, which are also exposed to increased wear are placed on said supporting means in removable, i.e. easily replaceable manner.

The guidance means according to the invention and preferred embodiments are described in greater detail hereinafter relative to the attached drawings, wherein show:

FIG. 1 A diagrammatic section at right angles to a predetermined path, the principle of the guidance means according to the invention.

Figure 2:
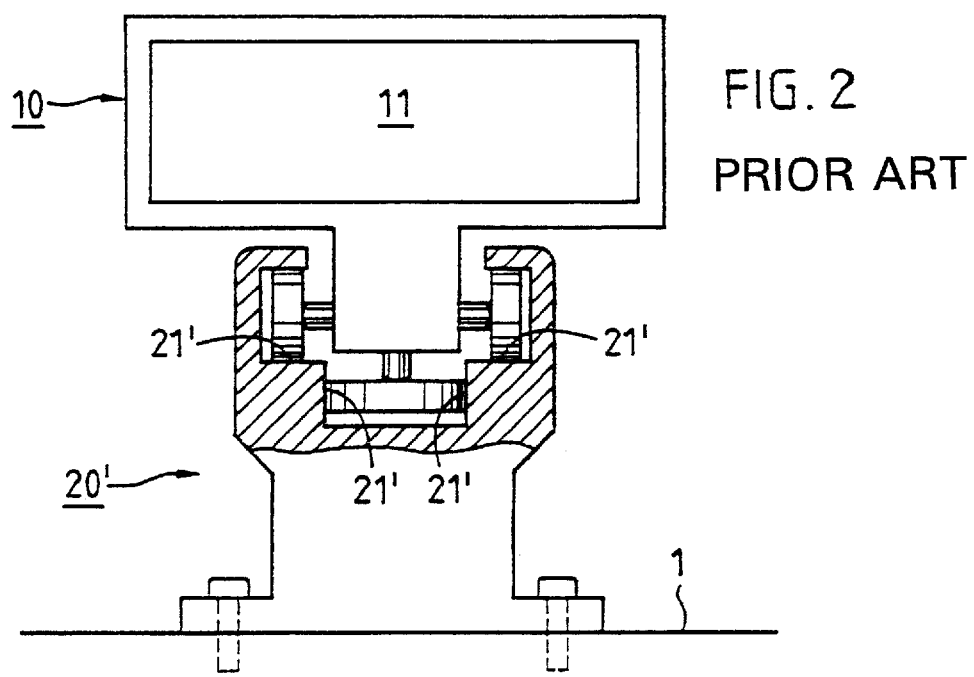

FIG. 2 In the same representation mode as in FIG. 1, for comparison purposes, a guidance means of the same type according to the prior art.

Figure 3:
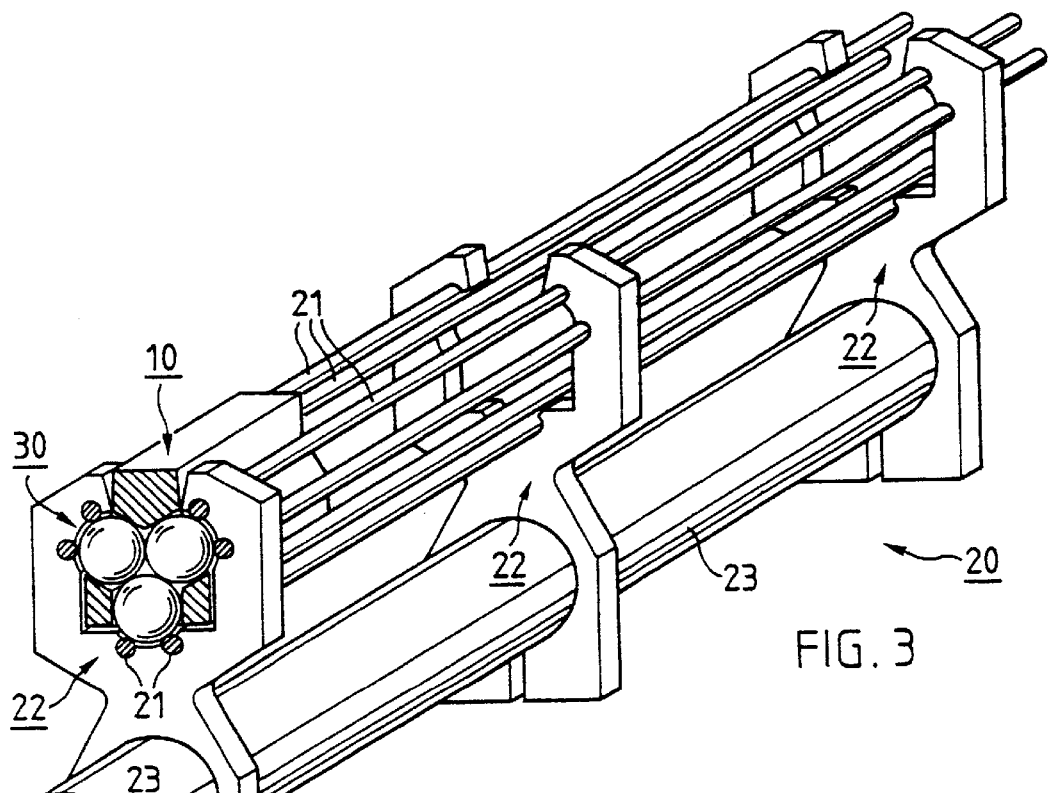
Figure 4:
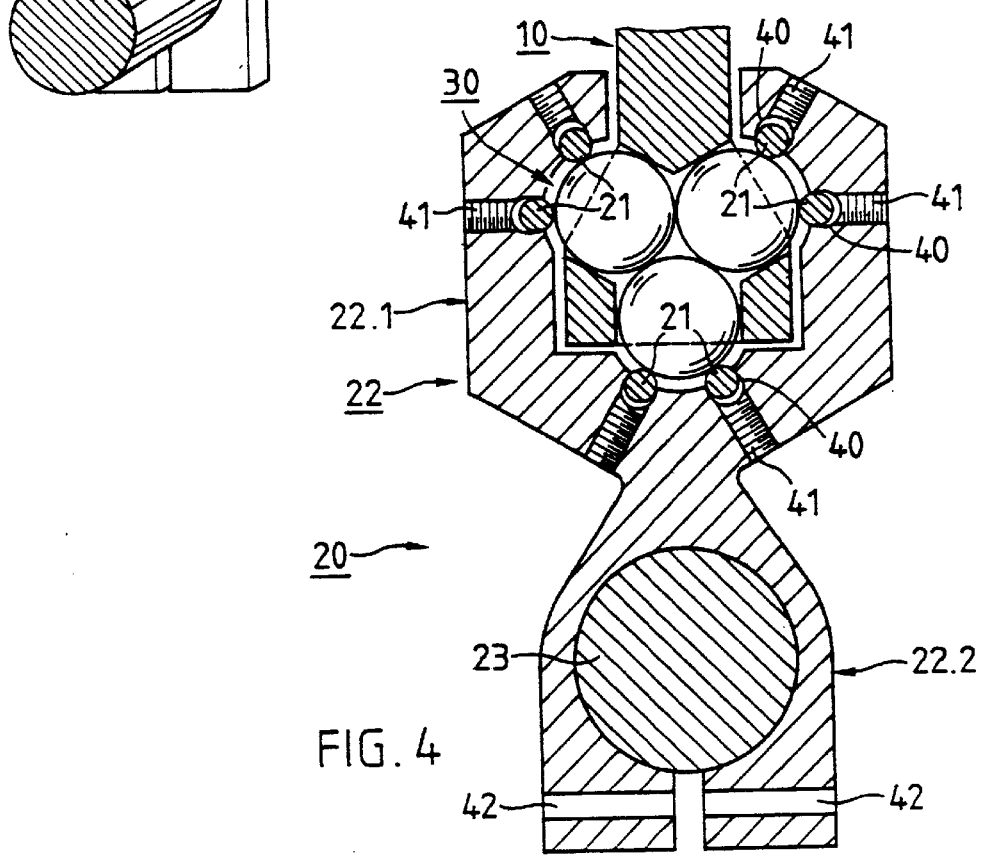

FIGS. 3 & 4 A first, preferred embodiment of the inventive guidance means as a three-dimensional representation (FIG. 3) and as a section at right angles to the predetermined path through a support element and through an object to be guided with the aid of the guidance means (FIG. 4).

FIGS. 5 to 9 Further exemplified embodiments of the inventive guidance means, once again in section at right angles to the predetermined path.

FIG. 1 shows the principle on which the invention is based with respect to an exemplified embodiment of the inventive guidance means. The guidance means 20 is shown in section perpendicular to the predetermined or preset path together with an object 10, which is movable guided by the guidance means along the preset path. The object 10 is e.g. a conveying means loaded or loadable with a load 11 and which e.g. rolls on rollers 12. The guidance means 20 has a guiding means and a supporting or carrying means.

In the represented case, the guiding means is an arrangement of four guide rails 21, which extend over the predetermined path in a substantially continuous manner, parallel to one another and at least partly spaced from one another and form a channel-like cage, the guide faces of the guide rails guiding the object 10 being directed against the interior of the cage.

The supporting or carrying means in the represented case comprises a plurality of discreet carrying or support elements 22 (only one being visible) and a base element 23, the latter being installed in fixed manner, e.g. on the floor of a building 1, on a building wall or on a building ceiling.

The guide rails 21 are long pieces of at least limitedly bendable, e.g. strip-like and advantageously quasi-continuously manufacturable profiles with an e.g. flat, L-shaped, U-shaped or similarly shaped cross-section. As a function of the intended use and loading, they are made from e.g. metal or plastic. They are supported by the support elements 22 in such a way that they run in parallel along the predetermined path with a precision adequate for the object to be guided.

The support elements 22 are spaced from one another along the predetermined path. They have on the one hand a holding area 22.1 embracing the cage formed by the guide rails 21 for the purpose of holding or maintaining the latter and with the aid of which the guide rails can be held and fixed in the predetermined arrangement, and a fastening or fixing area 22.2 with the aid of which they are advantageously randomly fastenable or fixable to a random base or, as shown, to a base element 23 belonging to the guidance means.

The guide rails 21 are at least bendable to the extent that they can be laid along the predetermined path. Advantageously, in the direction of the predetermined path, the support elements have such a limited extension, that in the case of any planned path course, i.e. in particular also on those path areas with the smallest radii of curvature, they are usable in unchanged form. The mechanical stability of the guide rails 21 and the spacings between the support elements 22 are so matched to one another that the guide rails 21 in the gaps between the support elements 22 can absorb the forces acting thereon as a result of the movement of the object 10 substantially with no deformation. The spacings between the support elements 22 in path areas with high loading, e.g. in highly curved areas can be smaller than in areas with a smaller loading, e.g. in linear areas.

The guidance means according to the invention consequently substantially comprises an arrangement of guide rails 21 and support elements 22, the guide rails 21 and support elements 22 are independent of the specific, planned path course. Together the guide rails 21 and support elements 22 constitute a construction set, with the aid of which the most varied path courses can be implemented. The cross-section of the guide rails and the holding area of the support elements, which together define the arrangement of the guide faces, are matched to the object to be guided and it is merely necessary to adapt the number of support elements 22 and the length of the guide rails 21 to a specific path course.

As the guide rails 21 only have to transfer or transmit very local and consequently small loads, they are relatively thin and light and can therefore be easily handled in considerable lengths and optionally in rolled up form. As a result of the building block system with such a small number of different components, a guidance means according to the invention is not only easy to manufacture, but can also be easily modified or extended.

As stated hereinbefore, the support elements 22 are fixed by their fixing area 22.2 to a base. This base can directly be a building part (floor, wall or ceiling) or an extraneous machine part. However, as shown in FIG. 1, it is advantageous to mount the support elements 22 on a base element 23, which extends at least over part of the predetermined path. It is also advantageous for the fitting of the support elements 22 to the base element 23 to be adjustable (different possible fitting or installation positions). In such a case the base element 23 can be installed with reduced precision and with a simplified course and the precision necessary for the object to be moved need only be adjusted on installing the support elements 23. The base element 23 shown in FIG. 1 is e.g. a rod or tube having a circular cross-section on which can be fitted, e.g. by engagement the support elements 22 in random pivoting positions (double arrow a).

The base element 23 e.g. extends over at least part of the predetermined path. Such a base element 23 has a shape to be adapted to the specific path course. However, it need not extend continuously over the entire path, i.e. it can comprise a random number of individual elements, which do not have to be interconnected particularly carefully. It is conceivable, in addition to areas with the base element, that the guidance means also has areas without a base element, i.e. areas with support elements fixed directly to components or other structures not belonging to the guidance means.

As a comparison with the guidance means according to the invention (FIG. 1), FIG. 2 diagrammatically shows a prior art guidance means 20', as is constructed for an identical object 10 to be moved. For the guidance means 20' the guiding function and supporting function are not separated, so that the requirement for a continuous extension over the entire predetermined path applies to the entire guidance means 20'. This leads to a guidance means 20' adapted to the path course with a plurality of surface areas 21' serving as guide rails and extending along the predetermined path. The guidance means is fixed to a random base (e.g. building floor 1).

If the guidance means 20' according to FIG. 2 is to be constructed as a building block, it will have to have a plurality of different guidance means pieces of different shapes (linear parts of different lengths and different directions and parts curved with different radii of curvature) and possibly means for linking the rail areas 21' between the guidance means pieces. Either the existence guidance means pieces will limit the planning of a path course or for each planned path corresponding pieces must be specifically manufactured. In particular, once the path course has been implemented it is difficult to modify and therefore also difficult to extend.

FIG. 3 shows in three-dimensional form a portion of an exemplified embodiment of a guidance means according to the invention. It is a guidance means 20 for objects 10, which move by means of groups 30 of in each case three or two balls in the guidance means 20, the balls of each group rolling on in each case two guide rails 21 and on the other balls of the group. Such systems are e.g. described in EP 387318 (or U.S. Pat. No. 5,074,678), corresponding, compact guide channels being provided as guidance means for the systems described therein and which as a function of the construction of the object 10 to be moved with the aid of the guidance means have a slot-like opening extending over their length or are in closed form.

The guidance means for such a system, according to the invention, is not a compact guide channel, but instead a guidance means 20, which once again essentially comprises an arrangement of guide rails 21 (in this case six), a plurality of discreet support elements 22 and optionally a base element 23. The guide rails 21 are held by the holding areas 22.1 of the support elements 22 in such a way that they form a cage-like arrangement extending substantially uniformly over the predetermined path and on whose inner surfaces or at least part thereof roll the object or at least portions thereof. The object 10 is movable in said guidance means 20 in the same way as in a guidance channel according to the prior art.

The guidance means shown in FIG. 3 is in particular suitable for an inventive construction, because the object 10 rolls on balls, i.e. requires a theoretically linear rail system. Guide rails for such an arrangement advantageously have, as shown in FIG. 3, a circular cross-section and are therefore equally bendable in all directions and can be turned at random on installation.

Apart from the advantages on installation and in the case of modifications of the inventive guidance means compared with the prior art, FIG. 3 makes clear the much simpler implementability of accesses of different types to the object 10 either between the guide rails or in areas where part of the guide rails is interrupted.

FIG. 4 shows in detail a section at right angles to the predetermined path through a support element 22, through an object 10 and through the base element 23 of a system according to FIG. 3.

The support element 22 has a holding area 22.1, which embraces the guide rail arrangement and on whose inside the six guide rails 21 having a circular cross-section are held in corresponding surface-narrowing slots 40. On installation, the guide rails 21 are snapped into the slots 40 and are then pressed against the opening of the slots 40 by not shown setscrews, which are screwed in through the tapped holes 41. The setscrews also permit a resetting of worn guide rails.

The support element 22 also has a fixing or fastening area 22.2, which in the represented case has a circular opening for the base element 23. The support element is clamped in place on the base element by means of a bolt or a screw (not shown) through the corresponding hole 42.

Figure 5:
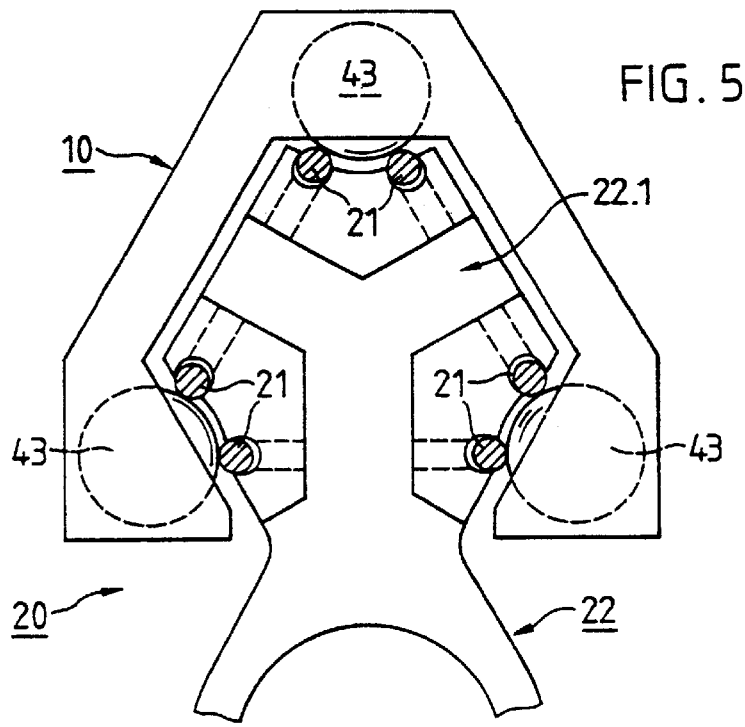

In a view in the direction of the predetermined path, FIG. 5 shows the holding area 22.1 of a further support element 22 for another embodiment of the inventive guidance means 20 with an object 10 to be guided. In this embodiment the object 10 rolls on the outside of the cage formed by the guide rails 21 and partly embraces the same. The holding areas 22.1 of the support elements 22 are located on the inside of said cage. The object 10 e.g. has balls 43 or rollers with the aid of which it rolls on the guide faces of the guide rails 21.

Figure 6:
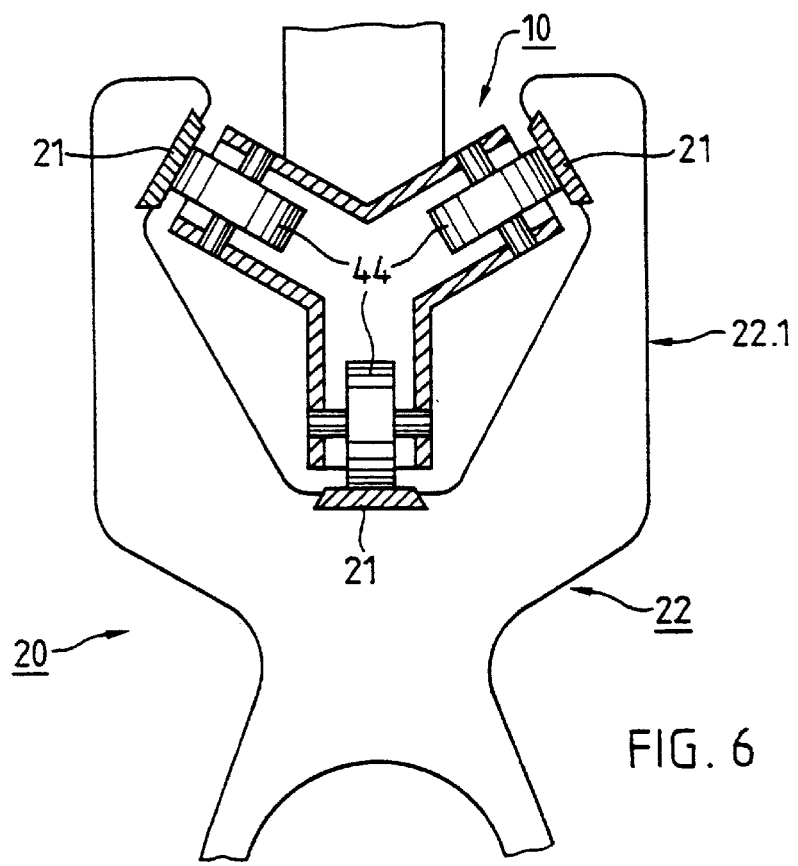

Like FIG. 5, FIG. 6 shows the holding area 22.1 of a further support element 22 for another embodiment of the inventive guidance means 20 together with an object 10 to be guided. As roller bodies, the object 10 has groups of three rollers 44, which roll on corresponding strip-like guide rails 21. The guide rails 21 form a cage, on whose inside roll the roller bodies 44 and kept in the predetermined position from the outside by the holding areas 22.1 of the support elements 22.

FIG. 7 shows in section at right angles to the predetermined path another embodiment of the inventive guidance means 20 with an object 10 to be guided and whereof only the rollers are shown. The object 10 is e.g. a link chain with groups of two runners 45 and a guide roller 46. The guidance means 20 once again has a base element 23 (here a tube with a circular cross-section) on which discreet support elements 22 are located. Guide rails, e.g. constructed as plastic profiles 21.1 and 21.2, run between the support elements. One of the profiles 21.1 has a U-shaped cross-section and serves as a guide rail for a runner 45 and the guide roller 46. The U-shaped profile 21.1 is inverted over correspondingly shaped regions of the holding area 22.1 of the support element 22, it advantageously being slightly deformed and consequently not requiring further fixing.

The profile 21.2 is a substantially strip-like profile with a comb, which is located on the profile side opposite to the running surface and serving as an interlocking means. This comb is positively held in a corresponding groove in the holding area 22.1 of the support element 22.

FIG. 7 shows in dot-dash line manner a second support element 22', which is fixed to the base element 23 in a reversed orientation compared with the support element 22. This second support element 22' is part of a further guidance means area of the same system or a different system, the support elements of the two guidance means areas being e.g. arranged in alternating manner on the base element 22 or can be constructed as twin elements.

FIG. 8 shows another embodiment of the guidance means according to the invention, once again in section at right angles to the preset path. This once again has a cage-like arrangement of guide rails 21, there being two guide rails with a U-shaped cross-section and in each case three guide faces. The guide faces of the guide rails 21 are oriented outwards and are used for guiding the roller bodies 41 and 48 of the object 10 to be guided, which embraces the guide rail arrangement. The guide rails 21 are held in position by the holding area 22.1 of a plurality of support elements 22. The holding area 22.1 is located in the interior of the cage-like arrangement of guide rails 21 and in this case is in the very simple form of a T-beam, the guide rails being turned up on the ends of the crossmember.

As a final example of an embodiment of the inventive guidance means, FIG. 9 shows the guidance of an object 10 in the form of a link chain, with the aid of which e.g. a force can be transferred to a path randomly selectable within wide limits. The guidance means 20 and link chain are shown in a section at right angles to this path. Such link chains are e.g. described in DE-2220259 (or U.S. Pat. No. 3,757,514) or DE-3121835 (or U.S. Pat. No. 4,397,145). The guidance means 20 once again comprises a cage-like arrangement of three guide rails 21, the link chain being trapped in said cage, the spherically designed chain links sliding on guide faces of the guide rails 21 directed against the cage interior. In principle, the support elements 22 have the same construction as the support elements of FIGS. 3, 4, 6 and 7, i.e. with holding areas 22.1, which embrace the arrangement of the guide rails 21.

What is claimed is:

1. A guide assembly for guiding rolling or sliding movement of an object (10) along a predetermined path following a freely selectable spatial course comprising the combination of a plurality of elongated guide rails (21) having guiding surfaces following said predetermined path, said guide rails being parallel with each other and extending substantially continuously over said predetermined path;

a plurality of separate, discrete support elements (22) along said predetermined path, each of said support elements having a holding area engaging and holding said plurality of guide rails such that said rails form an elongated cage extending along said path; and at least one base element (23) fixedly mounted along at least part of said path, said support elements being mounted on said at least one base element in a mutually spaced relationship, said support elements being positionally adjustable on said at least one base element.

2. A guide assembly according to claim 1 wherein said holding area of each support element is in an interior of said elongated cage and wherein said guiding faces of said guide rails face outwardly.

3. A guide assembly according to claim 1 wherein said holding area is external to said elongated cage and said guiding faces of said guide rails face inwardly.

4. A guide assembly according to claim 1 wherein said guide rails comprise continuously formed members of metal.

5. A guide assembly according to claim, 1 wherein said guide rails comprise continuously formed members of plastic.

6. A guide assembly according to claim 1 wherein each of said guide rails has a cross-sectional shape which is circular, flat, U-shaped or L-shaped.

7. A guide assembly according to claim 1 wherein said guide rails and each of said holding areas include mutually cooperating interlocking means.

8. A guide assembly according to claim 1 wherein said holding areas include means for removably attaching said guide rails in said holding area, said means for holding including set screws.

9. A guide assembly according to claim 1 wherein each of said support elements has a thickness in the direction of said predetermined path which is sufficiently small to permit said support element to be used in curved or straight portions of said path.

10. A guide assembly according to claim 1 wherein said support elements are spaced apart by distances determined by load forces in areas of said guide rails.

11. A guide assembly according to claim 1 wherein said at least one base element comprises a circular cross section for engaging a support element in any of a plurality of pivotal positions.

12. A guide assembly according to claim 1 wherein support elements having a plurality of holding areas are mounted on said at least one base element.

13. A guide assembly according to claim 1 wherein said objects comprise elements for conveying or force transmission, said elements being independent of each other or interconnected to form a chain of elements.

* * * * *